H. P. HUMPHREY.
COUPLING FOR GLASS PIPES.
No. 189,041. Patented April 3, 1877.
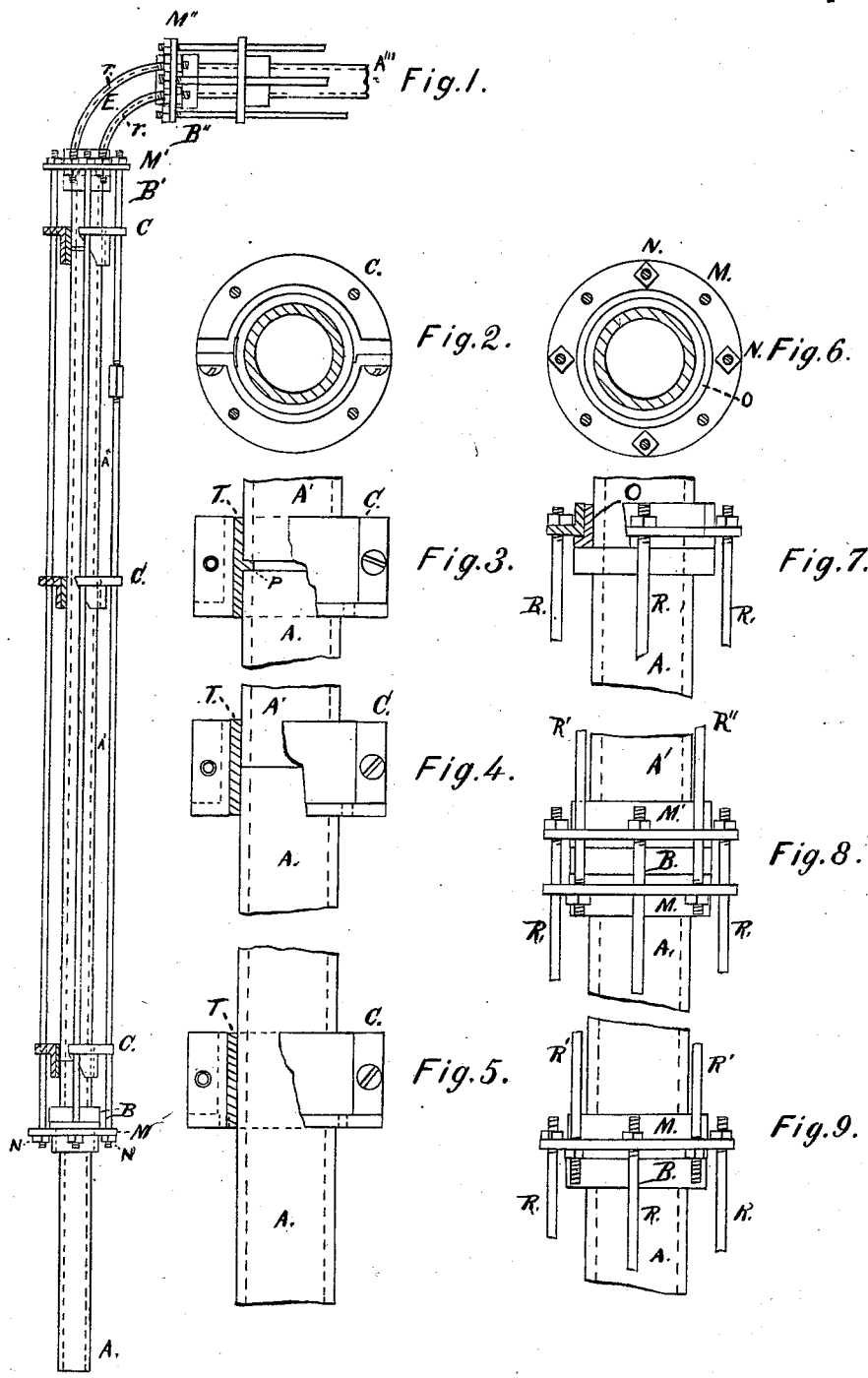

UNITED STATES PATENT OFFICE.

HENRY P. HUMPHREY, OF CHELMSFORD, ASSIGNOR OF ONE-HALF HIS RIGHT TO JOSEPH W. BRUCE, OF WESTFORD, MASSACHUSETTS.

IMPROVEMENT IN COUPLINGS FOR GLASS PIPES.

Specification forming part of Letters Patent No. 189,041, dated April 3, 1877; application filed December 23, 1876.

*To all whom it may concern:*

Be it known that I, HENRY P. HUMPHREY, of Chelmsford, in the county of Middlesex and Commonwealth of Massachusetts, have invented certain new and useful Improvements in Couplings for Glass Pipes used for conducting fluids, of which the following is a specification, reference being had to the accompanying drawings.

My invention consists in coupling and strengthening the joints of glass pipes by the means hereinafter described.

Figure 1 is a plan of several lengths of pipe and an elbow or bend connected by my coupling. Fig. 2 is an end view of a pipe and coupling with packing between them. Fig. 3 shows the packing at the joint, the coupling being broken away. Fig. 4 shows a joint formed by grinding the ends together. Fig. 5 shows a coupling-ring between the joints. Fig. 6 is the collar. Fig. 7 shows the cushion between the collar and pipe and boss. Figs. 8 and 9 show methods of applying another set of rods when the end of the first set is reached.

In coupling pipes by my method, Fig. 1, a sufficient number of lengths, A A' A'', of glass tubing, having their ends trued, to form that part of the pipe which is intended to be in the same straight line, are placed carefully end to end, having, however, a flat ring or washer, P, of elastic packing (of rubber, gutta-percha, or other suitable material) at each joint between the end of one length and the adjacent end of the next length. The joint is then covered with an elastic tube or ring, T. Over— that is, around—the tube T is placed a flanged metallic coupling-ring, C, which, for convenience, may be made in halves joined by screws, as shown in Figs. 2 and 3. On the first and last length of this straight line of pipe are formed annular glass bosses B B' B'', made in one piece with the pipe. A metallic collar, M M' M'', Fig. 6, is slipped over each end of this line of pipe, upon an elastic cushion, O, consisting of a tube and a washer or ring, which is placed between the collar M and the pipe A, and also between the collar and the boss B. Straight metallic rods, R R R, having screws cut on their ends, are then passed from end to end of this line of pipe through holes in said collars and coupling-rings, and drawn up by nuts N N. If this line of pipe is to be connected with another line running at an angle to it, the last length of the first line and the first length of the second line consist of an elbow, E, or turn, having a boss, B' B'', at each of its ends, and the collars M' M'' on the elbow E are made in halves and joined in the same manner as the coupling-ring above described. The elbow is joined to the other lengths in the same manner as if it were straight instead of curved; but the elbow is protected by stout curved rods r r r, having screws cut on their ends, and these ends passed through the collars M M, and these curved rods having each at each end two nuts, one on each side of the collar M' or M'', and turned up close to said collar, to hold the rods stiffly in place.

Where a very great length of pipe is used an additional coupling-ring, C, is placed between its ends to stiffen the pipe by holding it in place between the rods, (see Fig. 5,) an elastic cushion, T, being placed between the pipe and ring.

It will be seen that the different rates of expansion of the glass and metal are provided for by the elastic cushions, the metal nowhere coming in contact with the glass, so that the glass and the metal are free to expand or contract relatively to each other, either in diameter or in length; also, that the metallic rods stiffen the brittle pipe, and protect it from lateral motion and consequent breakage, acting, to some extent, as a metallic casing, so that when the different lengths are properly coupled, as above explained, the pipe is stiffer and stronger than if formed in one piece, by the additional stiffness and strength of the rods, because the rods must bend or break before the glass can bend or break, and each collar and coupling-ring braces the pipes in their place.

The method above described may be applied to pipes of any brittle material, as crockery, earthenware, or porcelain, and may be used to connect metal pipes with pipes of glass or other brittle material—as, for instance, to connect a metallic pump with the pipe herein described.

I claim as my invention—

1. The cushion O, placed between the collar M and the pipe A and boss B, as and for the purpose described.

2. The rods R R R, provided with nuts N N, in combination with the collars M M' and bosses B B', as and for the purpose described.

3. The coupling-rings C C and collars M M, in combination with the rods R R' R'', to prevent lateral motion of the pipes.

4. The method herein described of coupling pipes by elastic cushions and supporting-rods, substantially as herein described.

HENRY P. HUMPHREY.

Witnesses:
ALBERT M. MOORE,
J. S. SEARLE.